Feb. 18, 1969     R. C. CAMPBELL ET AL     3,428,877
SYNCHRONIZER FOR REGISTER CONTROL
Filed Dec. 1, 1965                            Sheet 1 of 3

INVENTOR.
REX C. CAMPBELL
EARLE B. McDOWELL
BY W. J. Shanley Jr.
THEIR ATTORNEY

INVENTOR.
REX C. CAMPBELL
EARLE B. McDOWELL
BY
THEIR ATTORNEY

United States Patent Office 3,428,877
Patented Feb. 18, 1969

3,428,877
SYNCHRONIZER FOR REGISTER CONTROL
Rex C. Campbell, Fishersville, and Earle B. McDowell, Waynesboro, Va., assignors to General Electric Company, a corporation of New York
Filed Dec. 1, 1965, Ser. No. 510,744
U.S. Cl. 318—85                                    6 Claims
Int. Cl. H02p 7/80; H02k 27/20; G05b 5/01

ABSTRACT OF THE DISCLOSURE

A synchronizer for register control to provide a space correction which is proportional to position error between two moving elements regardless of the relative speed with respect to each other of the two moving elements and to provide a velocity correction which remains a constant percentage of the relative speed for a given position error as the relative speed varies. A motor-operated potentiometer is utilized to provide a permanent memory of errors in the instantaneous relationship between the two moving elements and to provide a velocity correction signal which is proportional to the stored errors and which is also a constant percentage of relative speed for a given error as the relative speed varies.

---

Figure 1:
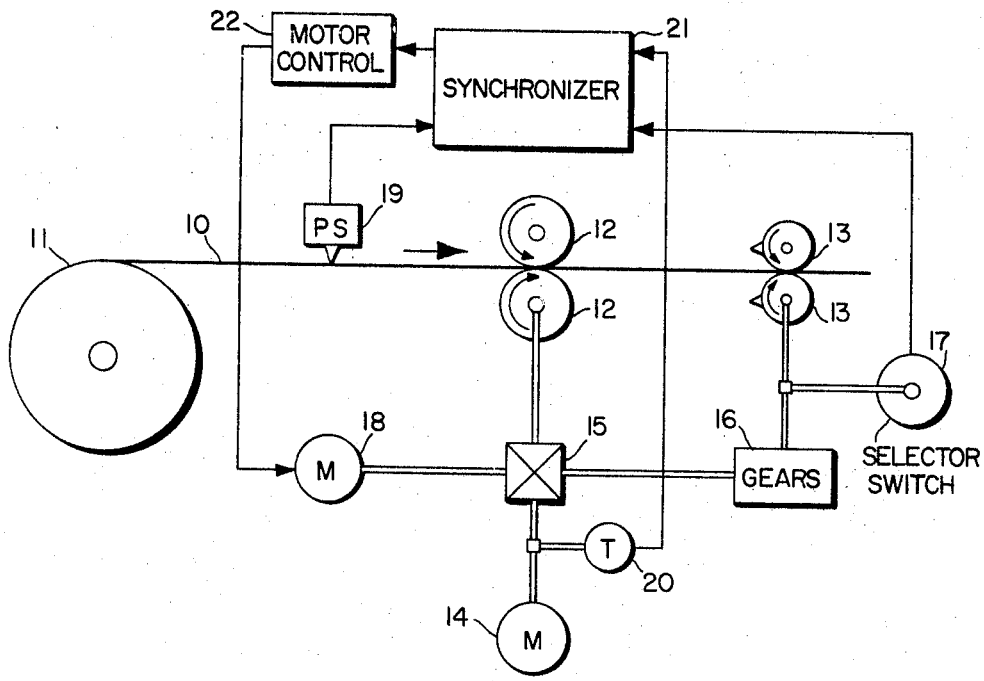

The present invention relates to an improved control system, and in particular to register control system having improved speed and position correction.

A register control system is concerned with the location and synchronization of a moving element with respect to a second moving element in which the second moving element may periodically perform an operation on the first moving element. Such a system is frequently encountered in a cutoff operation where the first moving element is in the form of a traveling web of material which is periodically cut into pieces of the proper size by the second moving element which, in this case, is a cutter. The problem that has been encountered with such systems is synchronizing the speed and position of the first moving element, such as the web, with the cutting operation so that the cut is made at the proper point each time. Many solutions for solving this problem have been presented. These solutions, however, have not been entirely satisfactory in providing speed correction proportional to position error regardless of web speed or velocity correction which is maintained constant from one indication of the relative position between web and cutter to the next at low speeds.

It is, accordingly, an object of the present invention to provide a register control system in which correction is proportional to error regardless of speed.

Another object of the present invention is to provide a register control system having a permanent memory of errors in the instantaneous relationship between the elements of the system controlled.

Another object of the present invention is to provide a register control system having a permanent memory velocity correction.

A further object of this invention is to provide a register control system having velocity correction that is a constant percentage of speed for a given error indication regardless of speed.

Another object of the present invention is to provide a register control system capable of correcting the velocity of a machine at a constant rate for an unlimited time.

These objects are realized in one embodiment of the invention by the provision of means for generating a voltage proportional to the speed of a moving element being controlled. A current derived from this voltage is applied to a first storage element for a period commensurate with the indication of discrepancy in position between this element and a second moving element which may be operating thereon. The signal stored is thus a correct indication of the discrepancy in position regardless of the speed of the machine and thus may serve as a correction signal for machine position. A second storage element is also provided to receive the current indicative of speed in like manner. This storage signal is applied to a memory element which develops a correction signal proportional to the signal stored by the second storage element and past stored signals and yet, because the memory element is also responsive to the voltage proportional to speed, the correction signal provided is a percentage of the speed of the moving element, and it may thus be said that a constant percentage velocity correction for a given error is maintained as the speed varies. The memory element provides permanent storage so that the signals presented to it are accumulated and maintained until changed by subsequent position error signals.

Figure 2:
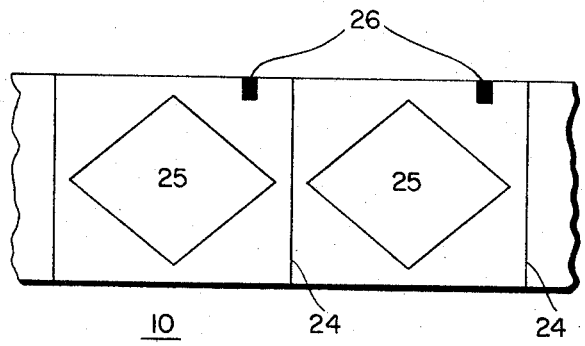
Figure 3:
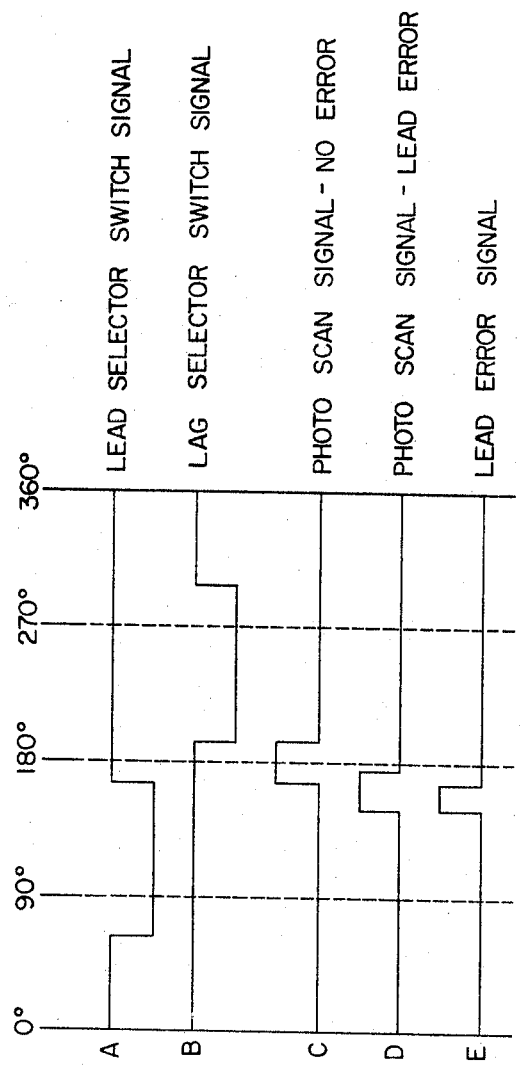
Figure 4:
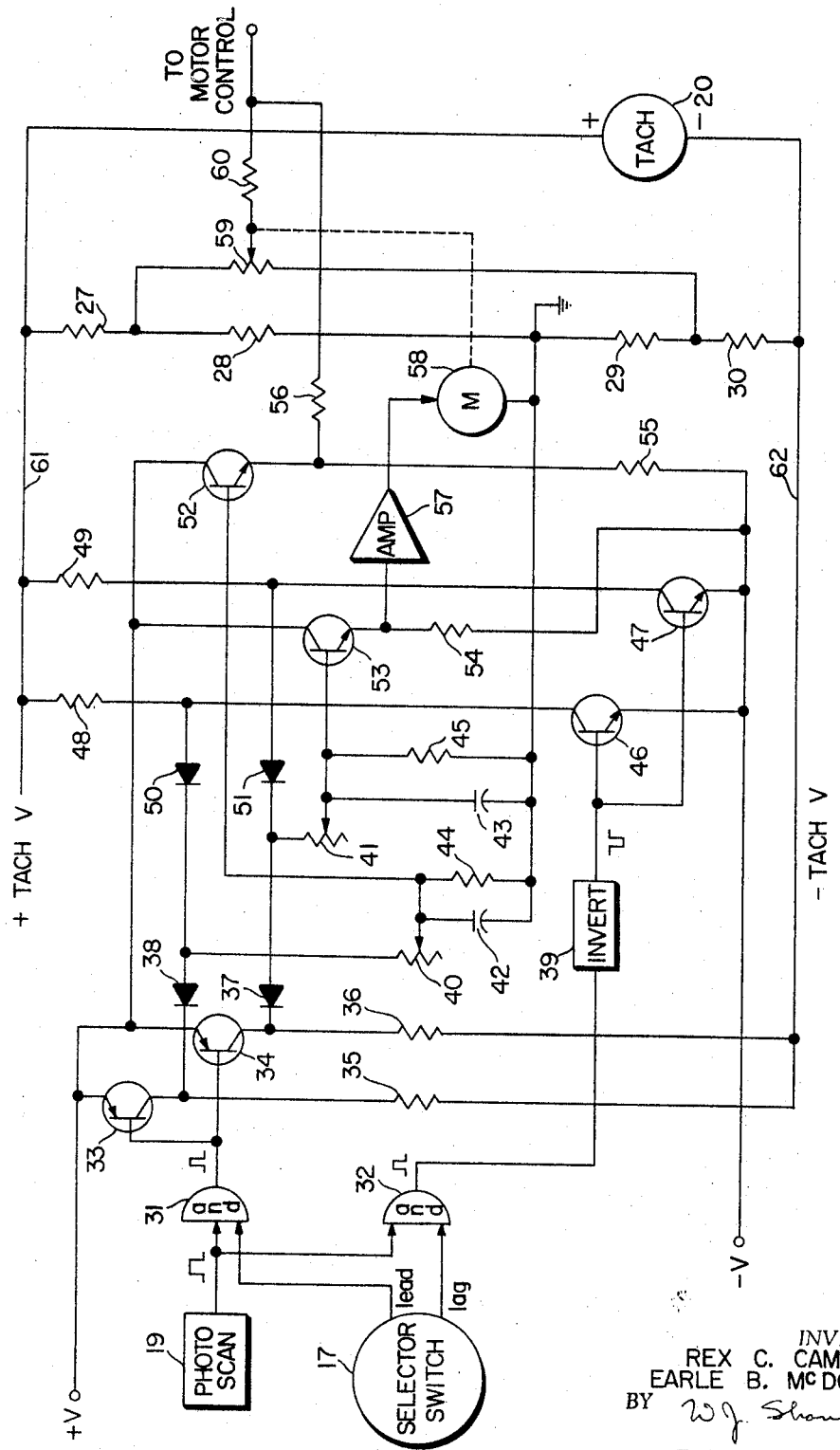

Other objects and advantages of the present invention will be better understood from a consideration of an embodiment of the invention chosen by way of example and shown in the drawings, in which:

FIGURE 1 illustrates a cutoff register control;
FIGURE 2 is a stop view of the material to be cut;
FIGURE 3 is a diagram illustrating position indication signals; and
FIGURE 4 is a circuit diagram including the register control synchronizer.

Referring now to the drawings wherein like numbers refer to like parts throughout, there is shown in FIGURE 1 a material cutting system including a wound coil of material 11 supplying a web of material 10 which is driven by the drive rollers 12 being turned by main drive motor 14. Drive motor 14 also operates a pair of cutting wheels 13 through appropriate gearing 16. Gears 16 are selected to provide a cut length equal to pattern length, where the material 10 contains a repetitive pattern 25, such as shown in FIGURE 2, or for any other desired cut length. In cutting patterned material, it is necessary not only to provide a standard length cut each time, it is also necessary that the cut be made at the end of each pattern as indicated by lines 24. Accordingly, there is provided a registration mark 26 as part of each pattern which is spaced the same distance from the end of the pattern 25 for each pattern. This registration mark serves as the means for indicating the instantaneous position of the moving web 10. While one mark is shown for each pattern, additional marks may be used as desired.

Photo scanner 19 is set a convenient distance from the pair of cutting wheels or operating element 13 to detect the marks 26 as they pass and to produce a signal in response thereto. Another sensing element in the form of a mechanically driven selector switch 17 senses an indication of the position of operating element 13 and generates an appropriate signal. This indication of the position of the cutting element is offset a distance from the cutting edge proportional to the distance of the register mark from the edge of a pattern so that in the absence of position error, the signals from the photo scan and the selector switch appear in registration, as indicated at C in FIGURE 3. The signals provided by the selector switch and the photo scanner are supplied to synchronizer 21. Tachometer 20 provides means for generating a voltage indicative of the speed of the main drive motor 14 which, of course, is also representative of the speed of moving element 10. This voltage is also supplied to synchronizer 21. The correction signal developed by the synchronizer 21 may be applied to a motor control circuit 22 which, in turn, controls a correction motor 18, the output of which is transferred by a differential 15 to provide the necessary corrections in the cutting system drive. The motor control circuit 22 may take various forms depending upon the type of correction motor 18 which is to be controlled.

For example, the motor control circuit 22 might include SCR's or thyratrons to control and reverse the flow of current to the armature of a direct current commutator motor. If such a control circuit is utilized, the reversing of the armature current of the direct current commutator motor will reverse the direction of the rotation of the motor.

FIGURE 3 illustrates the time relationship of the photo scan and selector switch signals during one cycle of operation. While FIGURE 3 shows that the signal from the selector switch may consist of a lead zone signal A and a lag zone signal shown at B which form the bounds of the indication of the position of the operating element 13 and the selector switch may thus be a sophisticated instrument such as is disclosed in application Ser. No. 472,-209, filed July 15, 1965, by William D. Cockrell, now Patent No. 3,334,795, there are a wide variety of indications which might be produced to show the position of a moving element and any standard means for providing the indication of such an element is suitable. At position C in FIGURE 3, there is shown the photo scan signal. The duration of the pulse there shown depends upon the width of the registration mark and the speed at which it passes the photo scan. The position of the pulse between the end of the lead signal and the beginning of the lag signal from the selector switch indicates that the position of the traveling web corresponds to the position of the cutter. At position D, there appears a photo scan signal which overlaps the lead selector switch signal and the pulse at position E indicates the amount of the error represented by the photo scan signal shown at D. FIGURE 3 thus illustrates one set of signals that may be generated to indicate the position of a moving member relative to a second moving member and the error signal developed in response thereto.

FIGURE 4 shows that the signals from the photo scan and the selector switch are applied to AND gates 31 and 32, the lead signal from the selector switch being applied to gate 31 while the lag signal is applied to gate 32. Thus when any portion of the photo scan signal overlaps the period of indication of a lead signal from the selector switch, an error pulse is developed as shown at the output of AND gate 31. Likewise, correspondence of scan signal and lag signal produces an output from AND gate 32. Because of the use of AND gates, the error signal produced thereby is a pulse of duration commensurate to the amount of position error. FIGURE 4 also shows a circuit diagram of the synchronizer 21 which receives these indications of leading or lagging position error.

Tachometer 20 serves as one of the two power supplies for the synchronizing circuit. Positive tach voltage appears on lead 61 and negative tach voltage is carried by conductor 62. Transistor switches 33 and 34 are coupled between the negative tach voltage bus and the positive supply +V, by resistors 35 and 36 respectively. A positive lead error pulse output from AND gate 31 will turn PNP transistors 33 and 34 off, permitting the negative tachometer voltage to be coupled to capacitors 42 and 43 via diodes 37 and 38 and variable resistors 40 and 41. These capacitors are thus charged at a substantially constant current determined by the value of the tachometer voltage and the high resistance of variable resistors 40 and 41. These variable resistors or potentiometers also serve as a gain control of the charge applied to the storage elements.

A lag error pulse from AND gate 32 is inverted by the inverter 39 and applied to transistors 46 and 47 to turn these NPN switching devices off. At this time, the positive tachometer voltage is coupled to the storage elements 42 and 43 by resistor 48, diode 50 and potentiometer 40, and resistor 49, diode 51 and potentiometer 41, respectively. It is thus seen that a current derived from a voltage which is proportional to the speed of the machine being controlled is applied to energy storage means for a period commensurate with the position error indicated. The purpose of capacitors 42 and 43 with their corresponding discharge resistors 44 and 45 is to stretch the error indication sufficiently so as to be suitable for application to a correction circuit which may include a rotating element such as correction motor 18. Thus, if the response of the correction circuit is fast enough or the speed of the machine being corrected is low enough so that the duration of the error signal is acceptable to the correction circuit, the signal stretching function provided by the RC circuit is not necessary and the error gated tachometer voltage can be applied directly to the motor control circuit for space correction and directly to the motor-operated potentiometer for velocity correction. The signal stretching or storage time required is provided in the circuit described by selecting the values of capacitors 42 and 43 and their associated discharge resistors 44 and 45 to provide a discharge time appropriate for the correction circuitry responsive thereto.

The signal stored by capacitor 42 constitutes a space or position correction signal and is applied to motor control circuit 22 directly via an emitter follower consisting of transistor 52 and resistor 55, and via resistor 56. This position correction signal is of short duration, governed by the discharge time of the energy storage means. The discharge or degree of signal stretching time is selected to be long enough to have some effect on turning correction motor 18 and yet is selected to be less than the spacing between marks so that the correction is complete for each error indication. The short period of operation of motor 18 momentarily jogs drive rolls 12 to change the position of the web of material 10 with respect to drive motor 14 and the position of the periodically operating element 13. It should be noted that turning of the shaft of correction motor 18 is effective through differential 15 to rotate or change the position of drive rolls 12, but is not effective through differential 15 to rotate or change the position of gears 16 so as to rotate the periodically operating elements 13.

The error signal stored by capacitor 43 is transferred to a storage device before it is applied to the motor control 22 as a velocity correction signal. The discharging of this capacitor turns on an emitter follower consisting of transistor 53 and resistor 54 which, in turn, applies this voltage through power amplifier 57 to motor 58. This motor then turns an amount proportional to the voltage stored by the energy storage means to move the wiper arm of potentiometer 59 a related distance through gear reduction means not shown. Potentiometer 59 and motor 58 constitute a motor-operated potentiometer which forms a permanent indication of the correction voltage contributed by the error signal stored by capacitor 43. Potentiometer 59 is energized by the tachometer voltage which may be stepped down by a divider network such as formed by resistors 27, 28, 29 and 30. With potentiometer 59 so energized, the correction signal produced by this permanent memory device is proportional to the speed of the machine being corrected. In fact, this correction, proportional to position error, is a percentage of the voltage indicating the speed of the machine and thus is constantly related to machine speed for varying speeds. The correction signal from the motor-operated potentiometer is applied to motor control 22 via resistor 60 which may be selected with regard to resistor 56 to determine the proportion of the total correction to be contributed by this motor-operated potentiometer as a velocity or speed correction. The velocity correction, because it is a continuous correction, is for a given error signal made quite small compared to the amplitude of the space correction. However, for repeated errors in one direction, the velocity correction accumulates to a value sufficient to prevent repeated position error.

It will be readily noted that the main difference in the velocity correction circuit from the space correcting circuit is the use of a motor-operated potentiometer. This permanent memory device provides a constant signal for the correction motor 18 so that a continuous correction is applied to drive rollers 12 via the differential 15. Reversible motor 18 thus either increases or decreases the speed of the drive as the position of the wiper arm on potentiometer 59 is moved up or down by reversible motor 58 for lag or lead errors of different amounts being registered by capacitor 43.

The motor-operated potentiometer provides a permanent memory of the error indication stored by the capacitor, yet is freely adjustable for each successive error indication. The unlimited time constant of this memory device provides a constant rate correction for an unlimited period of time or, construed another way, permits unlimited mark spacing which means that where long patterns are to be cut at slow speeds and the registered marks are widely spaced apart, the error indication does not deteriorate with time but is maintained for constant rate correction throughout this period. Even were the machine to be stopped, no new error indication would have to be inserted when the machine has started up again for the velocity correction to proceed correcting at the desired rate. If a capacitor, for example, were utilized as the memory element instead of the motor-operated potentiometer, a long discharge time would be needed to maintain correction between marks and at low speeds the correction rate would tend to fall off with charge decay. Because of the motor-operated potentiometer and the unlimited storage it provides however, only temporary storage for the purpose signal stretching is necessary and it is possible to utilize a short discharge time in the energy storage circuit associated with velocity correction. This permits the discharge time to be less than the time for the space between marks to be traversed at operating speeds and provides for a fixed correction per mark spacing, or for a given position error, the velocity correction is a fixed percentage speed correction regardless of speed. With a short discharge time, such as is available for space correction, it is possible to obtain an indication for each period of operation thus maintaining quicker adjustment for change and more precise operation.

It should be noted that capacitors 42 and 43 will charge to a negative voltage to correct for a leading error and charge to a positive voltage to correct for a lagging error. These capacitors are both connected at one plate to ground with the other coupled through the gain controlling potentiometers 40 and 41 respectively to the diodes and transistors which control the polarity of the charge. Because tachometer voltage determines the current flow to the capacitor for the duration of the error, it can be said for a given error the charge on the capacitor is constant regardless of machine speed. That this is so is readily seen from observing that as machine speed doubles, the tachometer voltage doubles and the duration of the pulse produced at the AND gate indicating the same amount of error is halved. Therefore, the charge on the capacitor remains the same.

Tachometer voltage is also applied across the terminals of the motor-operated potentiometer. This insures that the velocity correction is always proportional to web speed and there is no additional velocity correction needed for speed change.

The synchronizing circuit of the present invention provides two different corrections for a system having two moving members which must be maintained in registration. There is provided a space correction to correct for intermittent slippage or other position errors which may be corrected by advancing or retarding one moving element relative to the other, i.e., the web relative to the cutting edge. And, there is provided velocity or speed correction where, because of permanent alteration such as gradual change in slippage of the web in the drive rolls and varying tension on the web causing stretch, there is a difference in the speed of the movable member with respect to the member operating thereon. Since the velocity correction is a continuous adjustment in the speed of the drive, and because it is a cumulative correction, i.e., for the indication provided at each mark, even though the error is reduced, another same direction adjustment of the motor-operated potentiometer is produced, it is a very small correction compared to the one-shot per mark space correction.

It should be understood that the features of the synchronizer circuit of the present invention are not limited to a cutoff system. The advantages of correcting for position and velocity error when only provided position error information, providing this correction consistently regardless of speed change and even after stopping and restarting, and precision adjustment within each period of operation are advantages applicable to any system having two movable members in which the synchronization of the movement of the two members is desired.

Since various changes and modifications may be made in the practice of the invention herein described without departing from the spirit or scope thereof, it is intended that the foregoing description shall be taken primarily by way of illustration and not in limitation except as may be required by the appended claims.

What is claimed and desired to be secured by Letters Patent of the United States is:

1. In a control system for synchronizing the relationship between two moving elements, indicating means for periodically indicating the relative position between said moving elements, means responsive to said indicating means for developing for each position indication an error signal pulse of duration commensurate with the difference in position between said moving elements, first and second coupling means, generating means for generating a voltage proportional to the speed of one of said moving elements, switch means actuated by said error signal to apply said voltage to said first and second coupling means for the duration of said error signal, memory means coupled to said generating means and periodically coupled by said first coupling means to said switch means at each application of said voltage to said coupling means for a period that is less than the period of said indicating means, said memory means developing and maintaining a correction signal which is the percentage of speed of said one of said moving elements determined by said error signal and accumulated past error signals, and regulating means for adjusting the speed of said one of said moving elements in response to said correction signal and for adjusting the position of said one of said moving elements in response to the signal coupled thereto by said second coupling means.

2. The combination recited in claim 1 wherein said first and second coupling means are energy storage means each having a discharge time that is less than the period of said indicating means.

3. The combination recited in claim 2 wherein said memory means is a motor-operated potentiometer, the wiper of said potentiometer being positioned by said motor in proportion to the voltage stored by said first energy storage means and said generating means being coupled across said potentiometer.

4. In a control system for controlling the speed and position of a moving element with respect to an element periodically operating thereon, detecting means for detecting the position of said moving element during each period of the periodically operating element with respect to the position of said periodically operating element, means responsive to said detecting means for developing an error signal pulse of duration indicative of the difference in position between said moving element and said periodically operating element, first and second signal stretching means each having a stretching period less than one period of said periodically operating means, generating means for generating a voltage proportional to the speed of said moving element, means actuated by said error signal to apply said voltage to said first and second signal stretching means for the duration of said error signal, memory means coupled to said first signal stretching means and to said generating means to develop and maintain a correction signal which is the percentage of the speed of said moving element determined by said error signal and accumulated past error signals and regulating means for adjusting the speed of said moving element in response to said correction signal and for adjusting the position of said moving element in response to the signal from said second signal stretching means.

5. The combination recited in claim 4 further including first and second gain control means coupled to said first and second signal stretching means for regulating the amounts of said voltage applied thereto.

6. The combination recited in claim 5 wherein said memory means is a motor-operated potentiometer, the wiper of said potentiometer being positioned by said motor in proportion to the output signal of said first signal stretching means and said generating means being coupled across said potentiometer.

References Cited

UNITED STATES PATENTS

| | | | |
|---|---|---|---|
| 2,817,800 | 12/1957 | Schroeder | 318—314 X |
| 2,887,621 | 5/1959 | Wilde | 317—6 |
| 2,930,958 | 3/1960 | Schaufuss | 318—85 X |
| 3,073,997 | 1/1963 | Tagliasacchi | 318—85 |
| 3,186,273 | 6/1965 | Tomberg | 318—85 X |

ORIS L. RADER, *Primary Examiner.*

B. A. COOPER, *Assistant Examiner.*

U.S. Cl. X.R.

318—314